United States Patent [19]

Kitamura

[11] 4,370,678
[45] Jan. 25, 1983

[54] RECORDING APPARATUS WITH BEAM SCAN INFORMATION READING

[75] Inventor: Takashi Kitamura, Yokohama, Japan

[73] Assignee: Canon Kabushiki Kaisha, Tokyo, Japan

[21] Appl. No.: 215,828

[22] Filed: Dec. 12, 1980

[30] Foreign Application Priority Data

Dec. 21, 1979 [JP] Japan .................................. 54-166571
Jan. 24, 1980 [JP] Japan .................................... 55-7223

[51] Int. Cl.³ ............................................. H04N 1/24
[52] U.S. Cl. .................................... 358/285; 358/293; 358/294; 358/296; 358/302
[58] Field of Search ............... 358/285, 293, 294, 296, 358/302

[56] References Cited

U.S. PATENT DOCUMENTS

| | | | |
|---|---|---|---|
| 4,012,585 | 3/1977 | Chen | 358/302 |
| 4,214,157 | 7/1980 | Check | 358/302 |
| 4,270,131 | 5/1981 | Tompkins | 358/302 |
| 4,271,436 | 6/1981 | Kurose | 358/296 |

*Primary Examiner*—Howard Britton
*Attorney, Agent, or Firm*—Fitzpatrick, Cella, Harper & Scinto

[57] ABSTRACT

A recording apparatus in which at least two beams from a semiconductor laser are collimated by a common collimating lens and deflected by a common deflector. A part of the deflected beams is directed to a document for information reading while the rest of the deflected beams is directed to a recording medium after modulation at least with the information thus read. Also at the document scanning the beam intensity is controlled to eliminate the effect of shading phenomenon.

8 Claims, 8 Drawing Figures

RECORDING APPARATUS WITH BEAM SCAN INFORMATION READING

BACKGROUND OF THE INVENTION

1. Field of the Invention

The present invention relates to a recording apparatus in which the information on a document is read by beam scanning with a semiconductor laser generating plural beams, and more particularly to such apparatus in which the shading phenomenon is prevented at the beam scanning of the information on the document.

2. Description of the Prior Art

In a laser beam printer, the overlaying of a determined format on the output image can be achieved either electrically or optically. In the electrical method a frame memory corresponding to one page of the output image is provided for storing the format information to be overlaid, and the stored information is released simultaneously with the image signals. In the optical method, a format to be overlaid is prepared as a transparency for optical exposure, which is overlapped with a beam irradiation modulated with image signals. These methods are however defective in that the electrical method requires the expensive frame memory and cumbersome software for entering the necessary information into said frame memory, while the optical method requires a negative transparency for overlay in case the laser beam printer performs so-called negative exposure in which the exposed area turns out black in the output image.

SUMMARY OF THE INVENTION

The object of the present invention is to provide a recording apparatus with beam scan information reading capable of overlaid recording regardless whether the laser beam printer functions on the basis of a positive or negative exposure method.

Another object of the present invention is to provide a recording apparatus with beam scan information reading capable of overlaid recording by means of extremely simple structure and using an optical system.

Still another object of the present invention is to provide a recording apparatus with beam scan information reading featured in an extremely compact dimension.

Still another object of the present invention is to provide a recording apparatus with beam scan information reading capable of preventing the effect of the shading phenomenon at the original scanning.

DESCRIPTION OF THE PREFERRED EMBODIMENTS

Figure 1:
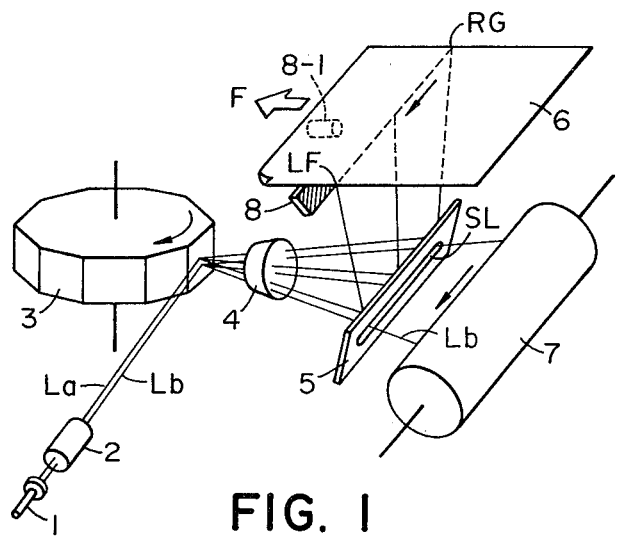
FIG. 1 is a perspective view of a recording apparatus embodying the present invention.

In FIG. 1, plural laser beams La, Lb generated by a semiconductor laser 1 are collimated by a single collimating lens 2, then deflected together by a rotary polygonal mirror 3, and converged by an imaging lens 4.

Figure 2:
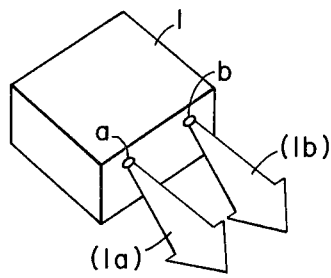
FIG. 2 is a perspective view of a semiconductor array laser.

The semiconductor laser 1 is provided with two elements a and b which are able to be independently driven on a wafer as shown in FIG. 2 in such a manner that the light-emitting points of said elements are arranged perpendicularly to the scanning plane or parallel to the direction of the rotary or deflecting axis of the deflector. Because of the collimation by a single lens, the laser beams La, Lb emerging from said two laser elements proceed in different directions and fall on spatially different positions on a mirror 5. Because of such different proceeding directions, the distance between the beams La and Lb can be arbitrarily regulated by the suitable selection of the optical path length even if the elements a, b are positioned close together. Said mirror 5 is provided with a slit SL parallel to the scanning direction. A beam Lb from the semiconductor laser passes through said slit SL and is focused on a photosensitive drum 7 (spot 1). The other beam La, falling on the mirror 5 on a position other than said slit SL, is reflected by said mirror 5 and is focused (spot 2) on the original 6 on which a form is written. When the original is moved in the direction of arrow F while the beam spot 2 of a constant intensity moves over the original 6 in a scanning motion, the reflected or transmitted light modulated according to the density of the original and is detected by a photodetector 8 to generate the original signal. The position of said photodetector 8 varies according to whether the original is light transmissive or reflective.

Figure 3:
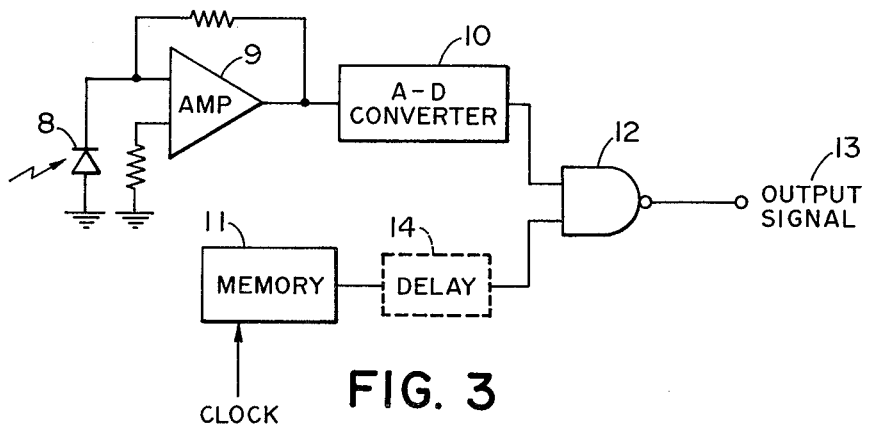
FIG. 3 is a circuit diagram for overlaid recording.

FIG. 3 shows the signal processing circuit of the present embodiment in which the original signal from the photodetector 8 is amplified by an amplifier 9 and converted into a binary signal by slicing at a suitable level in an analog-digital converter 10. The original signal thus obtained is synthesized in a logic circuit 12 consisting of an OR gate with the image signal read from an unrepresented magnetic tape or the like and stored in a semiconductor memory 11 to form a synthesized image output signal for activating a drive circuit for the element b of the semiconductor laser 1. Consequently said element b is simultaneously modulated both by the original signal and the image signal, thus achieving an overlaid recording. A positive or negative original 6 may be employed by simply inserting an inverter circuit behind the analog-digital converter 10. The time delay caused by the photodetector and the digitalization may become an obstacle in case of a high-speed image output. However if such time delay is always constant, it is possible to overcome by displacing the original in the direction of arrow F corresponding to said constant delay time.

It is further possible, as shown by the broken line in FIG. 3, to provide a delay circuit 14 for delaying the supply of the image signal to the logic circuit 12, and furthermore the overlapping of two forms of information can be regulated by using a delay circuit with a variable delay time.

The photodetector 8 in the embodiment shown in FIG. 1 is extended to cover the entire scanning width of the original 6. The use of a pin detector is desirable for a high-speed operation. However the use of such high-speed detector is often associated with the shading phenomenon or unevenness in the amount of light received from the original because of the limited light receiving area.

Figure 5:
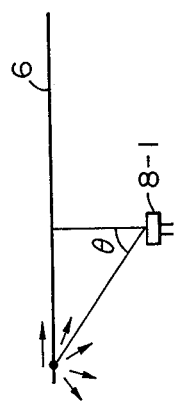
FIG. 5 is a view showing the relation between the beam scanning position and the detector position.
Figure 4:
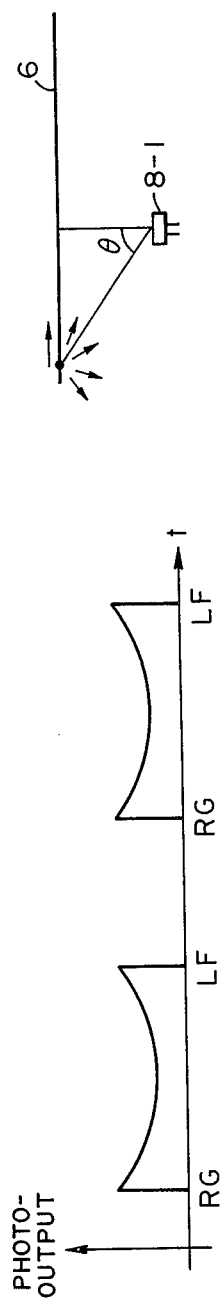
FIG. 4 is a chart showing the intensity change in the original scanning beam.
Figure 6:
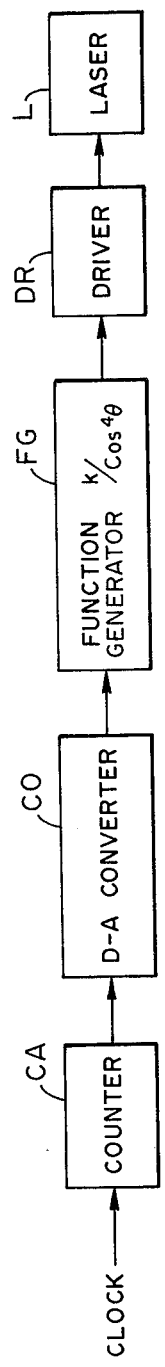
FIG. 6 is a circuit diagram for shading prevention.

In case a single photodetector 8-1 is positioned as shown by the broken line in FIG. 1 at the center of the original scanning line in place of the photodetector 8, the shading phenomenon will result due to the lowered amount of light received from the peripheral area of the original. Such phenomenon can be prevented by causing a change in the amount of light emerging from the semiconductor laser element a. For this purpose the light intensity should be so modulated as to be proportional to $1/\cos^4\theta$, wherein $\theta$ is the angle between a line connecting the photodetector and the spot position and the perpendicular line to the original plane as shown in FIG. 5. Such function may be generated by a function generator. As shown in FIG. 6, a counter CA for counting clock signals supplies the count signal to digital-analog converter CO for providing a corresponding voltage signal which is supplied to a function generator FG to drive the semiconductor laser L through a driver DR, thereby modulating the intensity of the beam La as shown in FIG. 4.

Such function generator can be composed of an approximating function generator known in the art, and in this manner it is rendered possible to eliminate the effect of the shading phenomenon from the detection output signal from the photodetector 8-1. However, in consideration of the positional error of the photodetector 8-1, it is preferable to achieve such correction in an empirical way as explained in the following with reference to FIG. 7. This empirical method consists of:

(1) using a white original giving uniform reflection or transmission to the laser beam;
(2) regulating the laser element at a constant beam intensity;
(3) performing beam scanning of one line;
(4) converting the output signal of the photodetector into digital signal by means of an analog-digital converter 8-2 and storing the thus obtained signal in a memory ME for each spot position; and also storing the detection output of the photodetector 8-1 corresponding to the central position of the beam in a center value memory CM; and
(5) upon completion of the scanning of one line, supplying the data stored in said memory ME, consisting of a shift register, in succession to an arithmetic unit ALU for dividing the center value stored in said center value memory CM with said data and again storing the results of said divisions in said memory ME.

After the original data stored in the memory ME are completely replaced by said results of divisions obtained from the arithmetic unit, the content of the memory ME is read in succession to drive said driver DR for obtaining laser output corresponding thereto. This procedure is repeated during the scanning operation to eliminate the effect of shading from the photodetector output.

Although the above-explained method requires a line buffer memory for storing the information of one line, the memory capacity need not be very high since a relatively low spatial sampling frequency is enough for practical purpose.

Figure 7:
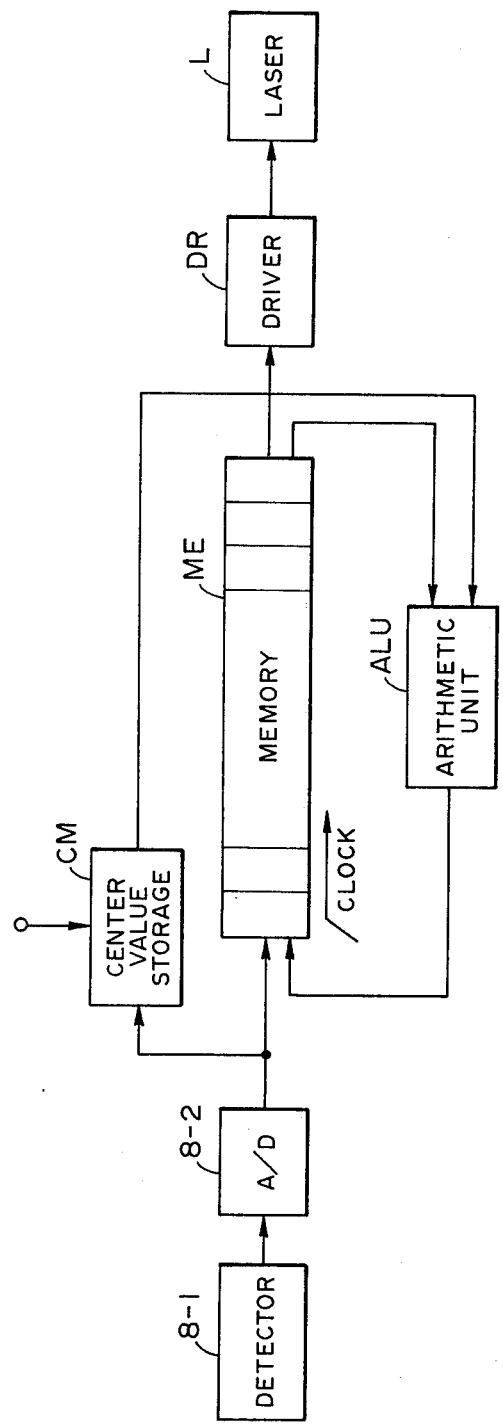
FIG. 7 is a circuit diagram showing another example for shading prevention.
Figure 8:
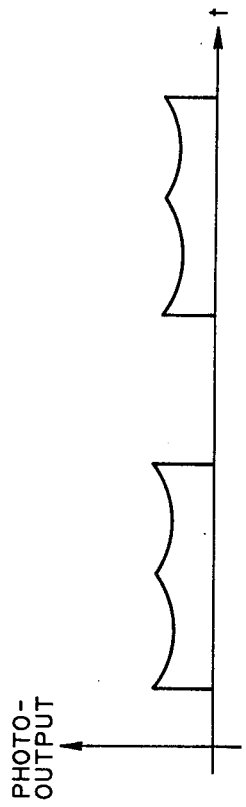
FIG. 8 is a chart showing the intensity change in the original scanning beam.

FIG. 8 shows the intensity behavior of the illuminating laser in case there are provided two photodetectors. Such characteristic can also be obtained by an apparatus as shown in FIG. 7.

What I claim is:

1. A recording apparatus with beam scan information reading, comprising:
    a semiconductor array laser capable of generating plural laser beams from respective laser elements;
    a collimating optical system in which said plural of laser beams from said semiconductor array laser are so commonly collimated as to have different emerging directions;
    deflecting means for deflecting the beams emerging from said optical system;
    irradiating means for irradiating a recording member with a portion of said deflected beams and irradiating a document with another portion of said deflected beams;
    converting means for converting the reflected or transmitted light obtained from said other portion of said deflected beams directed to the document into electric signals; and
    drive means for driving said laser elements for generating beams for irradiating said recording member according to said electric signals obtained by said converting means.

2. A recording apparatus with beam scan information reading according to the claim 1, further comprising an imaging lens for focusing plural beams deflected by said deflecting means onto said recording member and document.

3. A recording apparatus with beam scan information reading according to the claim 1, wherein said drive means further comprises logic means for adding image signals to the signals obtained from said document.

4. A recording apparatus with beam scan information reading, comprising:
    a semiconductor laser capable of generating plural laser beams from respective laser elements;
    a collimating optical system in which said plural laser beams from said semiconductor laser are so commonly collimated as to have different emerging directions;
    deflecting means for deflecting the beams emerging from said optical system;
    irradiating means for irradiating a recording member with a portion of said deflected beams and irradiating a document with another portion of said deflected beams;
    converting means for converting the reflected or transmitted light obtained from said other portion of said deflected beams directed to the document into electric signals;
    control means for controlling the beam intensity irradiating said document in such a manner that the electric signals obtained by said converting means are not affected by the irradiating position on the document of said beams; and
    drive means for driving said laser elements for generating beams for irradiating said recording member according to said electric signals obtained by said converting means.

5. A recording apparatus with beam scan information reading, comprising:
    laser means capable of generating plural laser beams from respective laser elements;
    a collimating optical system in which said plural laser beams from said laser means are commonly collimated;

deflecting means for deflecting the beams emerging from said optical system;

irradiating means for irradiating a recording member with a part of said deflected beams and irradiating a document with another part of said deflected beams;

converting means for converting the reflected or transmitted light obtained from said other part of said deflected beams directed to the document into electric signals;

a memory for storing characteristic signals representing positional characteristics of the scan position obtained through said converting means from a sample document scanned by said other part of said deflected beams;

arithmetic means for processing said characteristic signals stored in said memory for obtaining data for controlling the intensity of said part of said deflected beams irradiating the document; and control means for controlling the laser means for generating said other beams according to the intensity control data obtained from said arithmetic means.

6. A recording apparatus with beam scan information reading according to the claim 5, wherein said laser means is a semiconductor array laser.

7. A recording apparatus with beam scan information reading according to the claim 5, further comprising means for controlling said laser means for generating beams irradiating said recording member according to the output of said converting means.

8. A recording apparatus with beam scan information reading according to the claim 5, further comprising means for reading the content of said memory in synchronization with beam deflection by said deflecting means.

* * * * *